United States Patent [19]

Bieser et al.

[11] 3,855,077

[45] Dec. 17, 1974

[54] DISTILLATION DRYING PROCESS

[75] Inventors: Herbert J. Bieser, Des Plaines; Kenneth D. Uitti, Bensenville, both of Ill.

[73] Assignee: Universal Oil Products Company, Des Plaines, Ill.

[22] Filed: Nov. 30, 1972

[21] Appl. No.: 310,730

[52] U.S. Cl. ............... 203/14, 203/39, 203/87, 208/187, 260/674 A, 260/674 R
[51] Int. Cl. .......................................... C07c 7/04
[58] Field of Search..... 260/674 R, 674 A; 208/187; 203/14, 39, 87

[56] References Cited
UNITED STATES PATENTS

| | | | |
|---|---|---|---|
| R16,267 | 2/1926 | Stevens | 203/87 |
| 1,603,851 | 10/1926 | Lummus | 203/87 |
| 2,368,497 | 1/1945 | Shipley et al. | 208/187 |
| 3,408,264 | 10/1968 | Ward | 260/674 |
| 2,853,157 | 9/1958 | Harper | 208/187 |
| 2,366,901 | 1/1945 | Janeway | 208/187 |

*Primary Examiner*—Delbert E. Gantz
*Assistant Examiner*—C. E. Spresser
*Attorney, Agent, or Firm*—James R. Hoatson, Jr.; Robert W. Erickson; William H. Page, II.

[57] ABSTRACT

A process for drying, or simultaneously fractionationing and partially drying hydrocarbons having a dew point above that of water at the process conditions is performed in a single distillation column having two condensing stages and two receiving vessels on the reflux system, with the first receiving vessel containing no liquid water phase. Condensation in the first stage is purposely incomplete to avoid the formation of a liquid water phase, and to thereby form a reflux liquid that is drier than that in the prior art because it is in equilibrium with water vapor rather than with a liquid water phase. The remaining water and hydrocarbon vapors are removed, condensed and transferred to the second receiving vessel for decantation.

10 Claims, 1 Drawing Figure

PATENTED DEC 17 1974   3,855,077
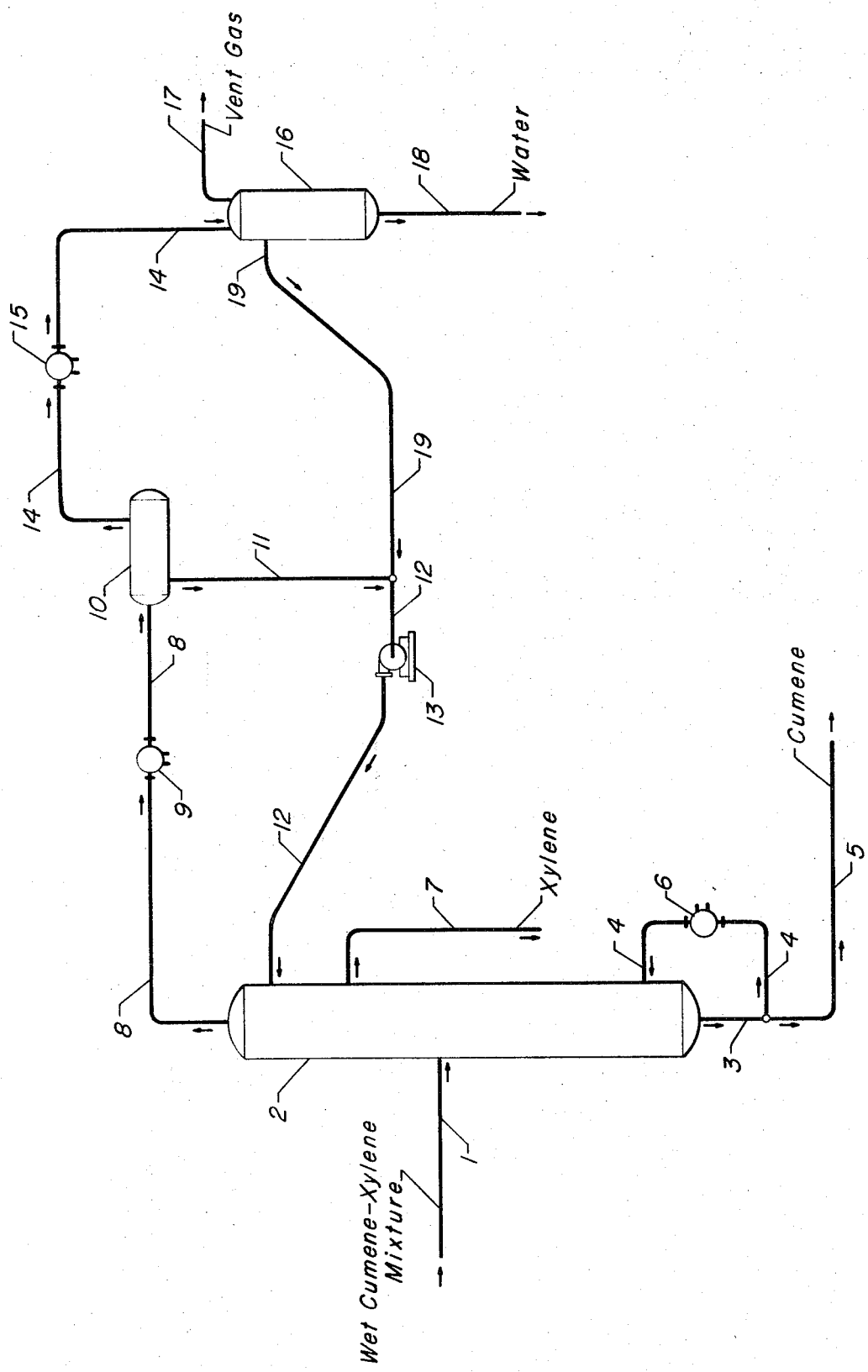

DISTILLATION DRYING PROCESS

BACKGROUND OF THE INVENTION

1. Field of the Invention

The invention relates to the drying or separation of hydrocarbons in a fractionation column, and more particularly it relates to the simultaneous partial drying and separation of hydrocarbons by fractional distillation in a single column.

2. Description of the Prior Art

There is a large body of knowledge on the subject of removing water from hydrocarbons by the use of distillation columns. This invention is specific to those instances where a hydrocarbon material has a dew point above that of water at the conditions present in the column, and the water is removed from the top of the distillation column. Since water and hydrocarbons are immiscible, the normal method to remove the water from the column is to condense all of the water rich overhead vapor stream to thereby produce two distinct liquid phases in a receiving vessel, from which the water is removed by decantation. The hydrocarbon phase is then used as reflux to the distillation column. This reflux is normally returned to the top tray in the column, and the reflux liquid is usually near the temperature of the boiling overhead mixture.

SUMMARY OF THE INVENTION

The invention resides in the use of two condensing stages and two receiving vessels in the overhead reflux system of a distillation column, with the first condensation being incomplete and forming only a liquid hydrocarbon phase used as reflux. This is followed by a further condensation of the vapors removed from the first receiving vessel to yield a small quantity of second liquid hydrocarbon phase, used as additional reflux, and a water phase that is decanted.

Despite the reflux material from the first condensation stage being warmer and therefore having a higher solubility for water than the cold reflux of the prior art the reflux of the present invention is drier than that of the prior art because it is in equilibrium with water vapor rather than with liquid water.

The invention comprises the steps of passing an overhead vapor from a distillation drying column to a first condenser which condenses essentially all the hydrocarbon vapor but not the water vapor, separating the liquid hydrocarbon formed from the remaining vapor and using it as reflux to the column further condensing the remaining vapor in a second condenser to form a liquid water phase and a second liquid hydrocarbon which are collected in a second receiving vessel, decanting off the second hydrocarbon liquid stream for use as additional reflux, and discarding the water phase and any remaining gases.

DESCRIPTION OF THE DRAWING

The invention may be more easily visualized by examination of the drawing of a particular embodiment, the simultaneous drying and separation of a wet mixture of xylene and cumene. The wet xylene/cumene mixture enters distillation column 2 by line 1 and is fractionated into a dry cumene fraction removed from the bottom of column 2 through line 3 and a dry xylene fraction that is removed by line 7. Product cumene is removed by line 5 while a portion of the cumene is passed by line 4 through reboiler means 6 where it is vaporized prior to reentering the column below the bottom tray. An overhead vapor stream of water and xylene is withdrawn through line 8 and cooled in condenser 9 sufficiently to condense most of the xylene as a liquid phase which is collected in separator 10. The cooling is not sufficient to form a separate water phase. Liquid xylene saturated with water with respect to the uncondensed vapor is withdrawn through line 11, and mixed with a small flow of relatively wet xylene from line 19 before passage through line 12 and pump 13 into column 2 as reflux. A water-rich vapor stream leaves separator 10 by line 14 and is cooled sufficiently by condenser 15 to condense essentially all the water and xylene present before their passage into separator 16. The small amount of relatively wet xylene which results is removed from separator 16 by line 19 for use as additional reflux while the water is decanted off through line 18 and noncondensible light gases are removed through line 17.

This drawing of a preferred embodiment of the invention and this description of the drawing are not intended to place any limitation on the invention, and are meant as an example only. In the interest of simplicity and clarity, controls, valves, heaters, heat exchangers and other pieces of equipment, as it is well known to those skilled in the art are required, have not been shown.

DETAILED DESCRIPTION OF THE INVENTION

A broad embodiment of the present invention is the fractionation of two liquid substances with the simultaneous removal of a third substance that at a relatively high concentration forms a separate liquid phase. A preferred embodiment of the present invention is the simultaneous fractionation and drying of a hydrocarbon stream, with the lightest hydrocarbon fractionated having a dew point above that of water. Another preferred embodiment is the drying of a organic compound having a dew point above that of water at the process conditions.

The present invention relates to those processes where, due to a high equilibrium vaporization ratio, or K factor, for water in the system, water is consequently collected as a column overhead stream.

Water often dissolves to a very low concentration in those hydrocarbons in which it is normally considered as being insoluble, and it will not spontaneously separate from these hydrocarbons at these low concentrations. At concentrations above the solubility limit, two separate phases will form. The immiscibility of these hydrocarbons and water is used in the prior art as a convenient means whereby a rough separation may be performed in the overhead receiving vessel of a distillation column. The hydrocarbon liquid phase, formed by the condensation of the water rich vapor leaving the top of the column is decanted and returned to the column.

The reflux material is preferably returned to the column at a temperature close to its boiling point in order to hold down the size of the condenser and the utilities cost. However, in some cases it is desired to cool the condensed liquid in order to lower solubilities, and to cause the formation of the two liquid phases needed for decantation. With a mixture having only partial miscibility, it is also possible to cause the formation of two liquid phases by raising the pressure rather than lowering the temperature. In the example given in the drawing and to be described in more detail, the preferred operating temperature of the overhead receiver is about 260°F. or some 20°F. below the boiling point of paraxylene. At this temperature and the preferred operating pressure of 5 p.s.i.g., all water is present as vapor. To cause the formation of liquid water the pressure must be raised to about 31.2 p.s.i.g., but in this particular case it is impractical to operate at this higher pressure because the relative volatility of the xylene/cumene is lower and this necessitates a higher column bottom temperature.

It is widely known that a mixture of three components can be separated to only a limited degree of purity in one distillation column. This is because two of the components must move towards one end of the column, and the liquid side cut taken between this end of the column and the feed point must be taken from liquid that is in equilibrium with vapor containing the component removed at that end of the column. It is therefore impossible to produce three separate, completely pure streams in one column.

It is one object of this invention to provide a process for the simultaneous performance of the separation and partial drying of two components in one distillation column having fewer theoretical trays than required by the prior art to achieve the same degree of drying. It is another object of this invention to provide a process for the drying of hydrocarbons or other organic compounds in a distillation column having fewer theoretical trays than required by the prior art to achieve the same degree of drying.

The present invention resides in the removal of the water from a first receiving vessel as a hot vapor rather than as a cool liquid, resulting in the formation of a hot reflux stream dry enough to use in the separation column without overloading the stripping section with water. The prior art method of cooling the overhead vapors to form two liquid phases and to allow a separation is in direct contrast to the method of the present invention, which shows the benefit of not cooling to such a great extent and removing the water as a vapor phase. It is not obvious that although the hot hydrocarbon that is returned to the distillation column in this matter is saturated with water with respect to the vapor, that this reflux material is dry enough to permit a relatively dry side stream to be removed from near the top of the column. Since the solubility of water in hydrocarbons increases with temperatures, it would seem that the hotter reflux of the present invention would contain more water than the prior art, when in fact because it is allowed to remain warm enough to prevent formation of a liquid water phase it contains less water. This is so because the liquid hydrocarbon is in equilibrium with gaseous rather than liquid water.

It is at this point beneficial to clarify the requirements set out previously in this discussion and in the appended claims as to the drying of only hydrocarbons having a dew point higher than that of water at the overhead conditions. Essential to the performance of the process of the present invention is the condensation of only the hydrocarbon, or other compound being purified, in the first condensation stage. If the water in the overhead vapor stream is condensed, the method of the prior art results. This limitation is important since light hydrocarbons, such as benzene or propane, having dew points below that of water are commonly dried with the collection of the water occurring at the top of the column due to the abnormally high activity co-efficients of water in low concentrations with these compounds.

Dew points for any material are dependent on the total pressure of the system. Where a mixture of two compounds is present, the dew point of the mixture will be between the limits established by the pure compounds, and will depend on the composition of the mixture. At any one pressure, the amount of the mixture present as liquid and as vapor is determined by the vapor pressures and activity co-efficients of the two compounds. Also, the percentage of each compound in the vapor or liquid phase is set by these properties. These facts must be considered in the design of the first condenser used in the process. The cooling must be down to a temperature less than the dew point of the pure hydrocarbon so that the majority of the hydrocarbon is condensed, and yet now below the temperature which will result in the formation of a liquid water phase. The reflux liquid of the present invention is therefore warmer than that normmally used in the prior art.

The dew point of a substance is by definition the temperature at which the first drops of liquid will begin to condense from a vapor at a specified pressure. The dew point of a mixture is always a higher temperature than the boiling point, which is the temperature at which bubbles of vapor start to form in the liquid phase. Therefore, an easy method of determining if a hydrocarbon can be more readily dried by the method of this process is to compare the boiling point of the hydrocarbon at the pressure of the proposed system with that of water. For successful operation the boiling point of the hydrocarbon must be greater than that of water or other substance to be removed, and this restraint guarantees that in the mixture of the two components the dew points will be in the proper relationship.

The immiscibility of the compounds separated is required only to provide an easy method of separating the hydrocarbon carried over into the second receiving vessel from the water or other compound being removed in the process. The use of the word immiscible is not intended to place any upper or lower limit on the solubility of the two compounds, and is intended to mean that at some concentration obtainable in the second receiver and at the operating conditions of the receiver, two liquid phases will form.

An additional limitation on the operation of the present invention is that if the compounds to be separated form a minimum boiling azeotrope, then the concentration of the lower boiling compound must be less than that present at the azeotrope. If the concentration is greater, the liquid formed upon cooling will be rich in the low boiling compound.

As an example of the method of the invention, the drying and fractionation of a 2773 pound mole per hour stream of meta-xylenne and cumene containing 360 molal ppm. of water will be described in detail. The distillation will be described as if it were being conducted in a column operated at about 5 p.s.i.g. and having the charge stock fed near the middle at 350°F. The overhead vapor, composed of xylene and water, is cooled sufficiently to produce liquid xylene which is collected in a receiving vessel maintained at 260°F., the temperature of the reflux stream, and at one atmosphere of absolute pressure. At this temperature, the solubility of water in the xylene is approximately 3.6 mole per cent and the reflux stream would therefore contain this much water and would be relatively wet if the xylene were in contact with a condensed water phase as per the prior art. This solubility increases to 5.8 mole percent at 305°F., the temperature of the overhead vapor.

By the process of the present inventiton, some water is left as a vapor, and is removed from the first receiving vessel in a small vent gas stream of about 4 moles per hour. It has been calculated that this gas stream would be composed of about 38.5 mole percent water, and that the xylene reflux liquid in contact with it in the first receiver would contain only 0.575 mole percent (5750 ppm) water. Since the rate at which water is fed to the column is about 1 mole per hour, it is apparent that an off gas stream of 4 moles per hour that is about 25 mole percent water is sufficient to remove the charged water from the system. The xylene removed with the vented vapor stream is recovered by further condensation into a second receiving vessel operated similar to the prior art. A relatively wet, 3 mole per hour liquid xylene stream is formed and returned as part of the reflux, and the water and any noncondensible gases are discarded.

The water concentration in the sidecut will be about 10 ppm. (molal), or less than 3 percent of the concentration in the charged material, if two theoretical plates are allowed between the reflux and the side cut. The heavier cumene fraction of the charged mixture will contain essentially no water and is removed from the bottom of the column. A summation of the hydrocarbon and water flows in this example is given in Table I.

the column, this descending liquid will contain the same amount of water as the liquid in the sidecut tray, and the sidecut tray water concentration would be set solely by the rising vapors. The lower water concentration at the top plate produced by the present invention reduces the number of plates required in a column to approach this limiting case.

The process of this invention may be advantageously applied to a simple drying process in which no hydrocarbon fractionation is performed. The product would be removed below the feed point and could approach any degree of dryness desired by the use of a sufficient number of trays. Utilization of the present invention would again increase the percentage of the charged water that could be removed by a column containing any set number of trays.

A significant feature of the present invention is that its addition to presently operating columns requires only very minor modifications to existing apparatus and control systems.

The invention can of course be modified as needed to perform similar separations of any three components, and is not meant to be limited to drying of mixtures of meta-xylene and cumene. For example, a commercial solvent may be dried in the same vessel in which an aromatic extract is being separated from it. Other examples are the drying and separation of para and meta-xylenes, or of n-octane and n-nonane. The compound removed as the impurity is not limited to being water, and could be any compound, such as an alcohol or an ether being removed during the fractionation of normal paraffins.

TABLE I

HYDROCARBON FLOW RATES AND WATER CONTENTS

| Stream | Moles Hydrocarbon Per Hour | Moles Water Per Hour | PPM Water (MOLAL) |
| --- | --- | --- | --- |
| Feed Mixture | 2773. | 1.0 | 360. |
| Bottoms Product (Cumene) | 1850. | nil | nil |
| Sidecut Product (Xylene) | 923. | 0.0082 | 10. |
| Overhead Vapor | 1945. | 12.1 | 6220. |
| Reflux (Total) | 1945. | 11.1 | 5750. |
| Vent Gas from First Receiving Vessel | 3. | 1.0 | 250000. |

The essence of the discovery is that adequate drying, for most purposes, can be performed using a smaller number of trays than the prior art, if water is removed from the receiving vessel as a vapor, rather than condensing all the water to form a liquid phase that may be removed by decantation. By the method of the prior art, the refluxed hydrocarbon would be in equilibrium with liquid water at a temperature of 250°F. and would contain 3.6 mole percent water. This is approximately six times as wet as the reflux material of the present invention. The reduced quantity of water returned to the drying column by the present invention results in a lower water concentration on the top plate and each plate below it.

As previously mentioned, the limiting case for the dryness of a sidecut is determined by the water concentration of the rising vapors which pass through the liquid in sidecut tray. Since these vapors pass on the next higher stage, the liquid in that stage will also contain water and will carry it down to the sidecut tray. Ideally, if enough trays are between the sidecut and the top of

We claim as our invention:

1. A process for the removal of a low dew point substance from a fractionation zone processing a feed stream comprised of a mixture of two high dew point materials in which the low dew point substance is immiscible at high concentrations, which process comprises the steps of:

a. passing the mixture of the high dew point materials and the low dew point substance into a fractionation zone;

b. withdrawing from said fractionation zone at the appropriate locations two desired liquid fractions of the high dew point materials;

c. withdrawing from said fractionation zone a first vapor phase comprising the lightest of said high dew point materials and the low dew point substance;

d. cooling this first vapor phase in a first condensation stage to a temperature which causes the formation of a liquid phase of the high dew point material and prevents formation of a liquid phase of the low dew point substance, and thereby also forming a second vapor phase which is rich in the low dew point substance;

e. separating said second vapor phase from the high dew point liquid formed in step (d);

f. returning high dew point liquid formed in step (d) to said fractionation zone as a reflux stream;

g. condensing essentially all of the high and low dew point material contained in said second vapor phase in a second condensation stage; and, h. collecting the liquid formed in step (g) in a second receiving vessel to allow its separation into a liquid phase of the low dew point substance, and a liquid phase of the high dew point material equal to that fraction of the high dew point liquid not condensed in step (d) less the high dew point material dissolved in said low dew point liquid.

2. The process of claim 1 wherein the low dew point substance is water.

3. The process of claim 1 wherein the higher dew point materials are organic compounds having boiling points in excess of 212°F. at atmospheric pressure.

4. The process of claim 1 wherein at least one of the two fractions of higher dew point materials is withdrawn from said fractionation zone between the feed point to the fractionation zone and the top of the fractionation zone.

5. A process for the removal of water from a fractionation zone processing a water containing charge stream of hydrocarbons having boiling points above 212°F. at one atmosphere of absolute pressure, which process comprises the steps of:

a. passing the water containing hydrocarbon charge stream into a fractionation zone;

b. withdrawing from the fractionation zone relatively dry liquid hydrocarbons as compared to the charge stock;

c. withdrawing at the upper end of the fractionation zone a vapor stream comprised of hydrocarbon and water;

d. cooling said vapor stream sufficiently in a first condensation stage to form a single liquid phase, said liquid phase comprising the hydrocarbon and dissolved water, and thereby forming in the first receiving vessel a second vapor stream relatively rich in water, e. separating the hydrocarbon liquid phase and the second vapor formed in step (d);

f. returning liquid hydrocarbon separated in step (e) to the fractionation zone as reflux;

g. condensing in a second condensation stage substantially all of the water and hydrocarbon contained in the relatively water rich second vapor stream of step (d);

h. separating the liquid formed in step (g) in a second receiving vessel to form a liquid hydrocarbon phase and a liquid water phase; and, i. returning hydrocarbon liquid formed in step (g) to the fractionation zone as reflux.

6. The process of claim 5 wherein the hydrocarbon mixture comprises aromatic hydrocarbons.

7. The process of claim 5 wherein the hydrocarbon mixture comprises a petroleum fraction.

8. The process of claim 5 wherein only one fraction of higher boiling point material is removed from said fractionation zone.

9. The process of claim 5 wherein at least two fractions of higher boiling point materials are removed from said fractionation zone, with at least one fraction being removed between the feed point to the fractionation zone and the top of the fractionation zone.

10. A process for fractionating a water containing mixture of xylene and cumene into separate streams of xylene and cumene, each stream having a lower water concentration than the charged mixture, which process comprises the steps of:

a. passing the water containing mixture of xylene and cumene into a fractionating column maintained at fractionation conditions;

b. removing from the bottom of said column a relatively water free stream of cumene;

c. removing from the column, at point between the feed tray and the top of the column, a stream of xylene;

d. passing the overhead vapor stream from the column into a first condensing stage;

e. cooling the overhead vapors to a temperature which causes the formation of liquid xylene and prevents the formation of liquid water;

f. returning liquid xylene formed in the first condensation stage to the column as reflux;

g. passing into a second condensation stage, the vapor which remains after the condensation of xylene in step (e);

h. cooling the overhead vapors to a temperature which causes the formation of liqiuid xylene and liquid water; and, i. separating the liquid water and liquid xylene formed in step (g).

* * * * *